(12) United States Patent
Kunkel et al.

(10) Patent No.: US 6,832,492 B1
(45) Date of Patent: Dec. 21, 2004

(54) OUTDOOR BUFFET COOLER

(76) Inventors: Anna Kunkel, 216 Myers Ln, New Cumberland, PA (US) 17070; Branden L. Kunkel, 216 Myers Ln, New Cumberland, PA (US) 17070

(*) Notice: Subject to any disclaimer, the term of this patent is extended or adjusted under 35 U.S.C. 154(b) by 0 days.

(21) Appl. No.: 10/603,016

(22) Filed: Jun. 24, 2003

(51) Int. Cl.[7] ............................................. F25D 13/00
(52) U.S. Cl. ............................ 62/458; 62/371; 62/457.6
(58) Field of Search ....................... 62/371, 457.6, 62/458, 459, 462, 465

(56) References Cited

U.S. PATENT DOCUMENTS

| | | | | |
|---|---|---|---|---|
| 4,375,758 A | * | 3/1983 | Simmons ................. | 62/457.1 |
| 4,739,580 A | * | 4/1988 | Simmons et al. ............. | 47/17 |
| 4,934,549 A | * | 6/1990 | Allen ......................... | 220/4.24 |
| 5,730,282 A | * | 3/1998 | Bureau ........................ | 206/223 |
| 6,085,535 A | * | 7/2000 | Richmond et al. ............ | 62/258 |
| 6,612,127 B2 | * | 9/2003 | Simmons ................... | 62/457.2 |

* cited by examiner

Primary Examiner—Melvin Jones
(74) Attorney, Agent, or Firm—Hooker & Habib, P.C.

(57) ABSTRACT

A cooler for chilling food is particularly suited for outdoor buffet service and has an ice tray and a base that raises the ice tray off the ground. The ice tray is formed from insulated walls defining an interior compartment and includes a bottom wall and a side wall extending around the outer periphery of the bottom wall. The bottom wall has an upper surface that slopes away from the side wall to a drain that extends through the bottom wall. The cooler can be drained without tilting the cooler.

11 Claims, 2 Drawing Sheets

OUTDOOR BUFFET COOLER

FIELD OF THE INVENTION

The invention relates to insulated coolers for chilling food.

BACKGROUND OF THE INVENTION

Outdoor entertaining has become very popular. Many hosts or hostesses enjoy providing an outdoor buffet for guests. Foods are served on serving dishes or platters placed on ice that keeps the buffet items chilled and fresh.

Conventional portable coolers are often used to hold the ice during the buffet. These coolers have insulated plastic or styrofoam side walls and bottoms that define an interior compartment for holding ice. A drain in a side wall enables melt water from the ice to be flowed out of the cooler compartment.

Although a portable cooler can be used for an outdoor buffet, using such a cooler has disadvantages. The cooler has a relatively small serving area, so several coolers are often needed for the number of dishes typically served at a buffet. The cooler walls are relatively high and often force guests to awkwardly reach into the cooler to the food. The high walls also impair the visibility and presentation of the foods served at the buffet. The cooler is often placed on a table to hold the foods at a convenient serving height. Tables that could be used by guests are dedicated to the buffet instead.

Additionally, draining the cooler while entertaining guests is difficult and could ruin the affair. Water discharges from the side of the cooler and can easily wet the table (or the guests!) if care is not taken to redirect or capture the flow. The drain location makes this difficult, and draining the cooler is often best done by carrying the cooler a good distance away from the buffet itself. Many conventional coolers must be tipped for drainage, and so serving dishes must be removed before draining the cooler.

Thus, there is a need for an improved cooler for use in outdoor buffets or other outdoor entertaining. The improved cooler should have a large serving area and provide good visibility and access to foods. Draining the cooler should be convenient and not require removing the cooler from the buffet or removing the serving dishes from the cooler.

SUMMARY OF THE INVENTION

The invention is an improved cooler for an outdoor buffet or other outdoor entertainment. The improved cooler provides a large serving area and provides good visibility and access to foods. Draining the cooler is convenient and does not require removing the cooler from the buffet. The cooler does not have to be tipped when drained.

A cooler in accordance with the present invention includes a bottom wall and a side wall surrounding the outer periphery of the bottom wall. Each wall includes insulating material to resist heat transfer through the wall. The bottom wall and the side wall define an interior compartment for receiving and holding ice in the cooler.

The bottom wall has a surface facing the interior compartment, the surface sloping downwardly from the side wall to a low point of the surface. The low point is preferably located at or near the center of the bottom wall surface but could be placed near or immediately adjacent the sidewall.

Melt water from ice in the cooler compartment flows by gravity along the bottom wall surface to the low point. A drain extends through the thickness of the bottom wall and discharges melt water from the cooler compartment. The drain inlet opening is at the low point of the bottom wall surface and the drain outlet is below the bottom wall to discharge melt water from the cooler.

The cooler includes a base or support that hold the bottom wall off the ground. The drain outlet is spaced above the ground such that the outlet is accessible from below and can completely discharge melt water without tipping the cooler.

In a preferred embodiment the bottom wall surface is rectangularly shaped and has a length of about 72 inches and a width of about 36 inches. The bottom wall is supported on spaced apart legs that provide about 36 inches of ground clearance to the bottom of the tray. Other dimensions can be used. A removable top or cover can be placed on the side walls to close the interior compartment or to form a temporary table top.

In yet other preferred embodiments of the invention the drain is formed from a pipe having a threaded discharge end. The threaded discharge enables a hose or bottle to be attached to the drain that redirects the flow of melt water away from the cooler or stores the melt water for later disposal.

The improved cooler of the present invention has many features that make outdoor buffets easier and more enjoyable. In addition, the cooler can be used at the beach or anywhere else that easy and convenient access to food is desired.

Other objects and features of the invention will become apparent as the description proceeds, especially when taken in conjunction with the accompanying two drawing sheets illustrating an embodiment of the present invention.

DESCRIPTION OF THE PREFERRED EMBODIMENT

Figure 1:
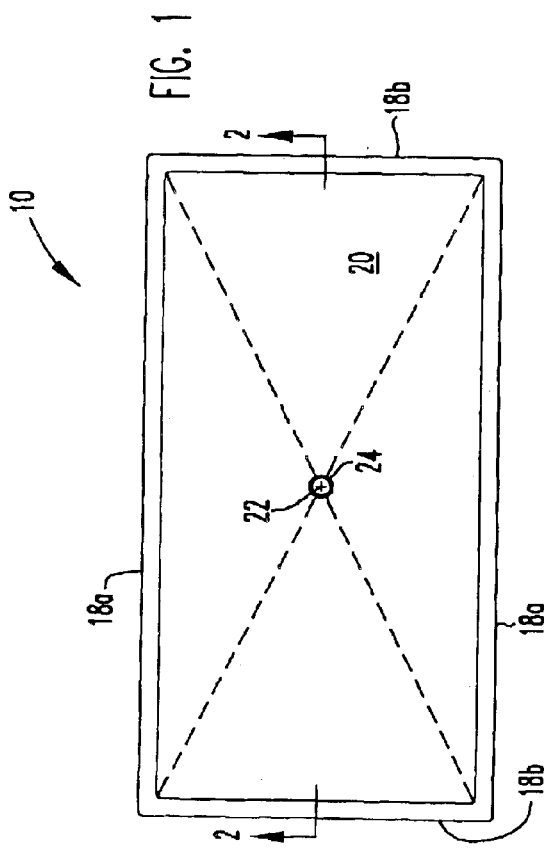
FIG. 1 is a top view of the outdoor buffet cooler in accordance with the present invention.
Figure 3:
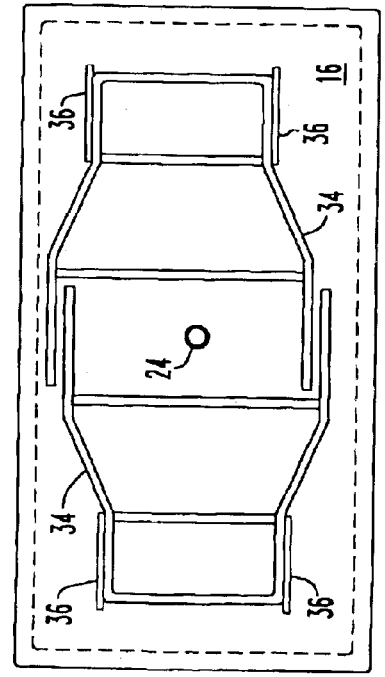
FIG. 3 is a side view of the cooler shown in FIG. 1 with the cooler legs extended.
Figure 4:
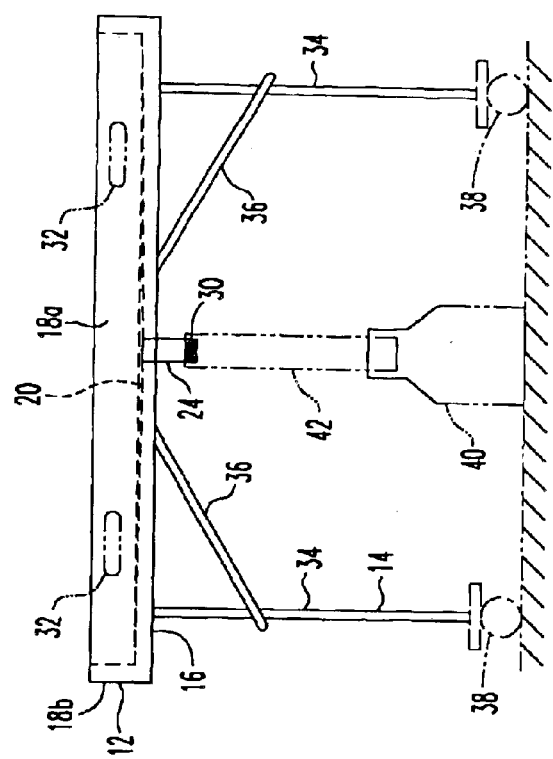
FIG. 4 is a bottom view of the cooler shown in FIG. 1 with the cooler legs folded.
Figure 2:
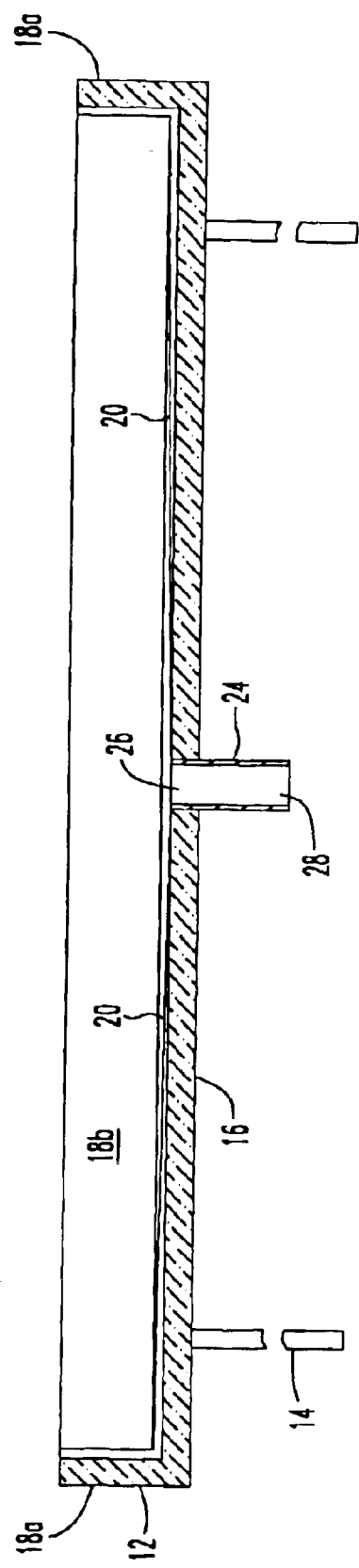
FIG. 2 is a sectional view taken along line 2—2 of FIG. 1.

FIGS. 1-4 illustrate a cooler 10 in accordance with the present invention. The cooler 10 includes an ice tray 12 mounted on a base 14. The base 14 places the tray 12 about 36 inches above the ground in the illustrated embodiment and allows access to the bottom of the tray.

Ice tray 12 has a bottom wall 16 and pairs of opposite side walls 18a, 18b extending from the outer periphery of the bottom wall. The tray walls 16, 18 are formed from insulated plastic like that used in conventional portable coolers. The side walls 18a, 18b extend upwardly from the bottom wall and cooperate with the bottom wall to define a compartment for holding ice. The bottom wall includes an upwardly facing surface 20 that faces the interior compartment. The surface 20 slopes continuously downwardly from the side walls 18a, 18b to a low point 22 centered between the side walls. A drain 24 extends through the bottom wall 16 and has an inlet 26 opening at the low point of the bottom wall surface. The drain extends to a free end defining an outlet 28 spaced away from the bottom wall. The drain 24 is formed as a pipe and has a threaded outer diameter 30 at the drain outlet. Pairs of through-hand grips 32 (shown in dashed lines in FIG. 4) can be provided if desired and are spaced along the side walls to make handling the cooler more convenient.

Stationary base 14 is permanently mounted to the bottom of the ice tray 12 and includes a pair of folding legs 34 and collapsible leg braces 36. The legs 34 are offset from each other to enable the legs to fold without interfering with each other The base 14 can include optional wheels 38 (shown in phantom in FIG. 4) that transform the base to a mobile base that permits the cooler to be easily moved without lifting.

The bottom wall surface 20 in the illustrated embodiment has a width of 36 inches and a length of 72 inches. The side walls 18 extend about 5 inches from the surface 20. Walls 18, 20 are each two inches thick, with a 1½ inch thick layer of insulating material and generally a half-inch thick air layer adjacent the interior compartment. Wall surface 20 drops about one-quarter inch to about one-half inch from the side walls 18 to the low point 22. The downward slope can vary in other embodiments and can vary at different points on the surface 20, but the slope should be sufficient to enable reliable gravity flow of melt water to the drain 24. Base 14 locates the bottom of the ice tray about 36 inches off the ground.

To use the cooler 10, ice is poured into the ice tray 12 and the serving dishes or platters are placed atop the ice. It is anticipated that the cooler 10 will be placed at its intended location prior to being filled with ice. The large area of the bottom surface 20 as compared with a conventional portable cooler allows placing a large number of dishes on the upper surface of the ice. The base 14 raises the dishes to a convenient height for food service without taking valuable table or chair space from guests. The side walls 18 are relatively short, less than the maximum width or length of the bottom surface 20, and enable the food to be easily viewed and served.

Melt water from the ice falls to the bottom surface 20 and flows by gravity to the drain 24. The drain discharge is readily accessible from the bottom of the ice tray 12 and can be closed with a plug or cap (not shown) to prevent water from draining out of the tray compartment. A hose is easily connected to the drain discharge to flow the melt water away from the cooler) or the melt water can flow into a bucket or container placed on the ground below the drain. Alternatively, a bottle 40 and hose 42 (shown in phantom in FIG. 4) can be attached to the drain to store melt water drained from the ice compartment. Melt water completely drains from the cooler without tipping the cooler. Furthermore, the bottom drain permits placing the sides of adjacent like coolers immediately adjacent the cooler 10 to save space.

The legs 34 fold to save space for storage. The legs are offset from each other a slight amount to enable the legs to close without interfering with each other, see FIG. 4. A cover (not shown) can be provided that fits over the ends of the side walls 18 and close the interior compartment or form a temporary table top. Hooks or other utility devices can also be mounted on the outside of the ice tray 12 to hang utensils and the like.

While an embodiment of the invention has been described, it is understood that this is capable of modification, and therefore the invention is not limited to the precise details set forth, but include such changes and alterations as are obvious to one having skill in the art of the present invention.

What we claim as our invention is:

1. A cooler for keeping foods chilled on ice held in the cooler, the cooler comprising:

a bottom wall and a side wall surrounding the outer periphery of the bottom wall, each wall comprising insulating material to resist heat transfer through the wall, the side wall extending from the bottom wall to an upper end of the side wall, the bottom wall and the side wall defining an interior compartment for receiving and holding ice in the cooler;

the bottom wall having a surface facing the interior compartment, the surface sloping downwardly from the side wall to a low point of the surface whereby melt water from ice in the cooler compartment flows by gravity along the bottom wall surface to the low point;

a drain extending through the thickness of the bottom wall to discharge melt water from the cooler compartment, the drain having an inlet and an outlet, the drain inlet opening at the low point of the bottom wall surface to receive melt water and the drain outlet below the bottom wall to discharge melt water from the cooler; and means for supporting the bottom wall off the ground wherein the drain outlet is spaced above the ground such that the drain outlet is accessable from below the bottom wall and can completely discharge melt water without tipping or further raising the cooler.

2. The cooler of claim 1 wherein the downward slope of the bottom wall surface comprises a vertical change in elevation of at least one-quarter inch.

3. The cooler of claim 1 wherein the drain outlet is a threaded pipe.

4. The cooler of claim 1 wherein the bottom wall surface is generally rectangular-shaped and has a width dimension of about 36 inches and a length dimension of about 72 inches.

5. The cooler of claim 4 wherein the means for supporting the bottom wall of the ground comprises a stationary base attached to at least one of the bottom wall and the side wall.

6. The cooler of claim 5 wherein the stationary base comprises foldable legs.

7. The cooler of claim 1 wherein each wall comprises at least one-half inch thick insulating material.

8. The cooler of claim 1 wherein the means for supporting the bottom wall off the ground comprises a mobile base.

9. The cooler of claim 1 wherein the bottom wall surface has a width dimension of about 36 inches and a length dimension of about 72 inches;

the drain outlet is threaded; and the means for supporting the bottom wall off the ground comprises one of a stationary base and a mobile base.

10. The cooler of claim 1 wherein the sidewall comprises hand grips for manually carrying the cooler.

11. The cooler of claim 1 wherein the side wall extends a first length dimension from the bottom wall; and the bottom wall surface has a second maximum length dimension greater than the first length dimension.

* * * * *